(12) United States Patent
Chen et al.

(10) Patent No.: US 10,415,657 B2
(45) Date of Patent: Sep. 17, 2019

(54) ONE-WAY BEARING (71) Applicant: Shanghai Changyi Machinery Manufacture Co., Ltd., Shanghai (CN)

(72) Inventors: Bang Chen, Shanghai (CN); Junrong Tan, Shanghai (CN)

(73) Assignee: SHANGHAI CHANGYI MACHINERY MANUFACTURE CO., LTD, Shanghai (CN)

( * ) Notice: Subject to any disclaimer, the term of this patent is extended or adjusted under 35 U.S.C. 154(b) by 528 days.

(21) Appl. No.: 15/116,666

(22) PCT Filed: Mar. 17, 2015

(86) PCT No.: PCT/CN2015/074355
§ 371 (c)(1),
(2) Date: Aug. 4, 2016

(87) PCT Pub. No.: WO2015/144005
PCT Pub. Date: Oct. 1, 2015

(65) Prior Publication Data
US 2016/0348728 A1    Dec. 1, 2016

(30) Foreign Application Priority Data
Mar. 24, 2014 (CN) ............ 2014 2 0134891 U (51) Int. Cl.
*F16D 41/067* (2006.01)
*F16C 33/78* (2006.01)
(Continued)

(52) U.S. Cl.
CPC .......... *F16D 41/067* (2013.01); *F16C 19/463* (2013.01); *F16C 19/466* (2013.01);
(Continued)

(58) Field of Classification Search
CPC .... F16D 41/064; F16D 41/066; F16D 41/067; F16D 2041/0601; F16C 19/463; F16C 19/466; F16C 33/7809; F16C 41/001
(Continued)

(56) References Cited

U.S. PATENT DOCUMENTS 3,206,829 A    9/1965  Schaeffler et al.
4,236,619 A *  12/1980 Kuroda .................. F16C 17/26
                                                192/45.016
(Continued)

FOREIGN PATENT DOCUMENTS

CN    201401442 Y    2/2010
CN    102312941 A    1/2012
(Continued)

*Primary Examiner* — Richard M Lorence
(74) *Attorney, Agent, or Firm* — Renner Kenner Greive Bobak Taylor & Weber (57) ABSTRACT

A one-way bearing, including: an outer race fixed around an inner supporting bracket, wherein the combination of the outer race and the inner supporting bracket defines a plurality of cavities between the outer race and the inner supporting bracket; and a rolling member provided in each of the plurality of cavities, wherein the rolling member is arrange to rotate and move within each of the plurality of cavities; wherein a blocking structure is provided at each of the plurality of cavities so as to block the rolling member within each of the plurality of cavities from entering an adjacent cavity.

19 Claims, 7 Drawing Sheets (51) Int. Cl.
*F16C 41/00* (2006.01)
*F16C 19/46* (2006.01)
*F16D 41/066* (2006.01)

(52) U.S. Cl.
CPC ........ *F16C 33/7809* (2013.01); *F16C 41/001* (2013.01); *F16D 41/066* (2013.01)

(58) Field of Classification Search
USPC .............................. 192/45.001–45.02, 109 R
See application file for complete search history.

(56) References Cited

U.S. PATENT DOCUMENTS

| | | | | |
|---|---|---|---|---|
| 5,101,946 A | * | 4/1992 | Lederman | F16D 41/067 |
| | | | | 192/45.006 |
| 7,143,881 B2 | * | 12/2006 | Ichihara | F16D 41/067 |
| | | | | 192/45.009 |
| 2010/0096234 A1 | * | 4/2010 | Liang | F16D 41/066 |
| | | | | 192/45.018 |

FOREIGN PATENT DOCUMENTS

| | | |
|---|---|---|
| CN | 202165432 U | 3/2012 |
| CN | 102549279 A | 7/2012 |
| CN | 202628358 U | 12/2012 |
| CN | 203822850 U | 9/2014 |
| DE | 102008005029 A1 | 7/2009 |
| JP | 07279952 A | 10/1995 |

\* cited by examiner

ONE-WAY BEARING

TECHNICAL FIELD

The present invention relates to a one-way bearing, and particularly, although not exclusively, to a one-way bearing having an improved anti-jamming structures.

BACKGROUND

Bearings are one of the most important mechanical components in various mechanical structures. A bearing enables a rotational shaft mounted to the bearing to rotate freely with respect to a structure fixed with the bearing.

A typical bearing may include a plurality of rolling elements between the rotational shaft and an outer race. During operation, the rolling elements may rotate and/or move within the cavity between the rotational shaft and the outer race. In response to the rotational movement of the rolling elements, the rotational shaft may rotate freely with respect to the rotational axis of the bearing. Bearings may be made to permit the rotational axis to rotate at single rotational direction or both rotational directions according to different internal structures.

SUMMARY OF THE INVENTION

In accordance with a first aspect of the present invention, there is provided a one-way bearing, comprising: an outer race fixed around an inner supporting bracket, wherein the combination of the outer race and the inner supporting bracket defines a plurality of cavities between the outer race and the inner supporting bracket; and a rolling member provided in each of the plurality of cavities, wherein the rolling member is arrange to rotate and move within each of the plurality of cavities; wherein a blocking structure is provided at each of the plurality of cavities so as to block the rolling member within each of the plurality of cavities from entering an adjacent cavity.

In an embodiment of the first aspect, the blocking structure is arranged to block the rolling member from entering the adjacent cavity when upon the rolling members experiences a lateral force along a radial direction with respect to a central rotational axis of the one-way bearing and a rotational force with respect to the central rotational axis.

In an embodiment of the first aspect, the rolling members are arranged to permit a rotational shaft placed along the central rotational axis to rotate in a first direction with respect to the outer race and to prevent the rotational shaft to rotate in a second direction opposite to the first direction with respect to the outer race.

In an embodiment of the first aspect, the rolling member is configured to move to a narrower side of each of the plurality of cavities when the rotational shaft is forced to rotate in the second direction with respect to the outer race.

In an embodiment of the first aspect, each of the plurality of cavities is defined by a wedge shaped protrusion deposited at an inner peripheral surface of the outer race and the inner supporting bracket.

In an embodiment of the first aspect, each of the plurality of cavities is wedge shaped.

In an embodiment of the first aspect, the blocking structure is positioned at a narrower side of each of the plurality of cavities.

In an embodiment of the first aspect, the blocking structure is a protrusion rib positioned at an inner peripheral surface of the outer race.

In an embodiment of the first aspect, further comprising a metal ring at each side along the central rotational axis.

In an embodiment of the first aspect, the metal ring is arranged to provide supplementary support to the rotational shaft when upon the rotational shaft experiences a lateral force along a radial direction with respect to the central rotational axis.

In an embodiment of the first aspect, the metal ring is a copper ring.

In an embodiment of the first aspect, further comprising a seal ring adjacent to each metal ring.

In an embodiment of the first aspect, the seal ring is arranged to prevent debris, dust and/or water from entering the plurality of cavities.

In an embodiment of the first aspect, the seal ring is arranged to prevent a leakage of lubricant applied to the plurality of cavities and/or the rolling members.

In an embodiment of the first aspect, the seal ring includes an inner diameter smaller than an inner diameter of the metal ring.

In an embodiment of the first aspect, further comprising a biasing member provided in each of the plurality of cavities, wherein each of the biasing member is arranged to bias the rolling member within the respective cavity of the plurality of cavities.

In an embodiment of the first aspect, the biasing member is arranged to bias the rolling member towards a wider side within each of the plurality of cavities.

In an embodiment of the first aspect, wherein the biasing member is a spring plate.

In an embodiment of the first aspect, the rolling member is a roller.

In an embodiment of the first aspect, the rolling member is a needle roller.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised a one-way bearing that may be implemented as part of various mechanical structures such as a one-way clutch structure. Referring to FIGS. 1 to 4, there is shown a one-way bearing 100 comprising a plurality of rollers 102 mounted in a plurality of cavities 104 defined by an outer race 108 and an inner supporting bracket 110. Preferably, the cavities 104 are wedge shaped and each comprises a narrower end and a wider end. The rollers 102 are arranged to rotate within the cavity 104.

Figure 1:
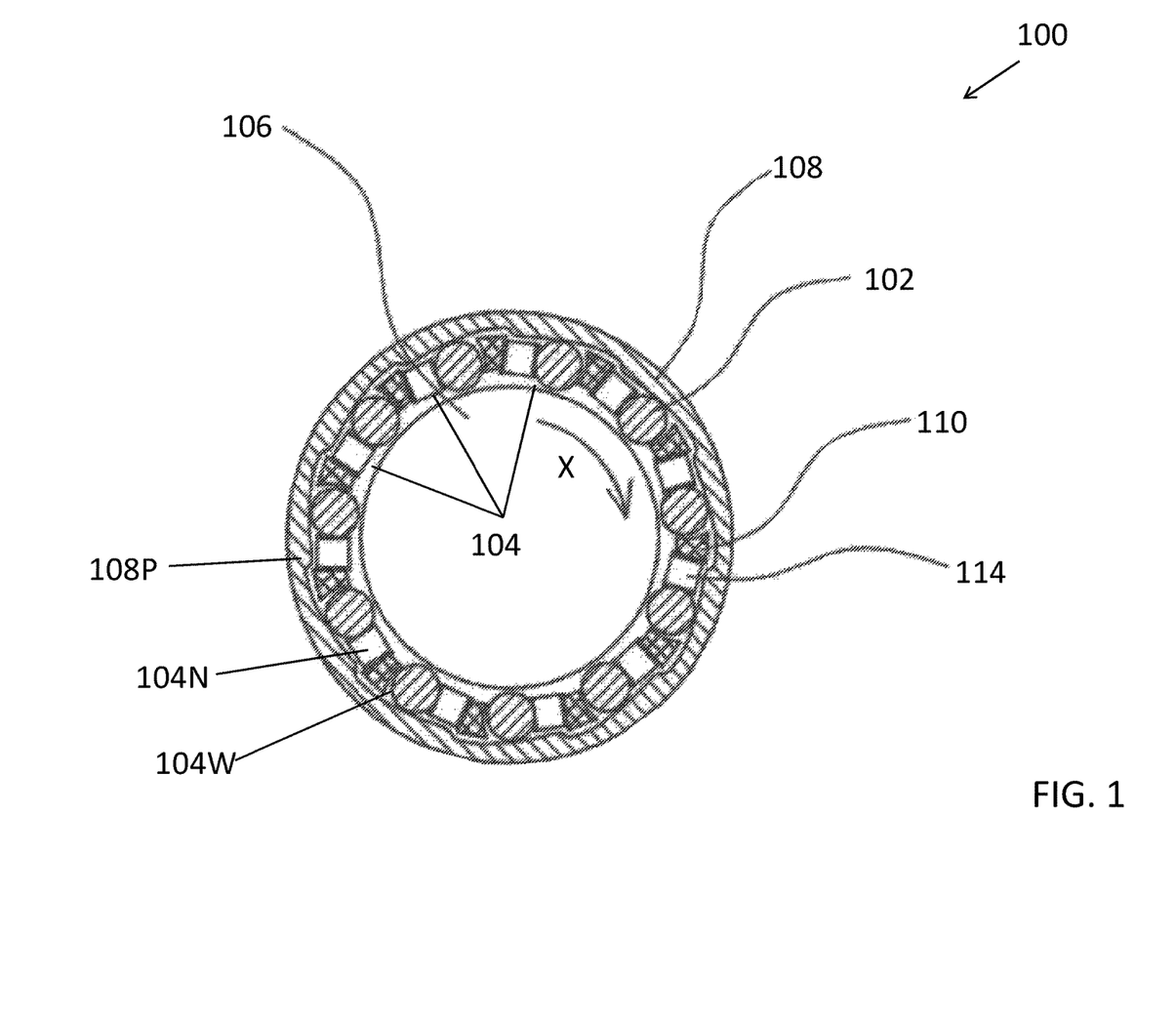
FIG. 1 is a cross-sectional view of a generic one-way bearing.
Figure 2:
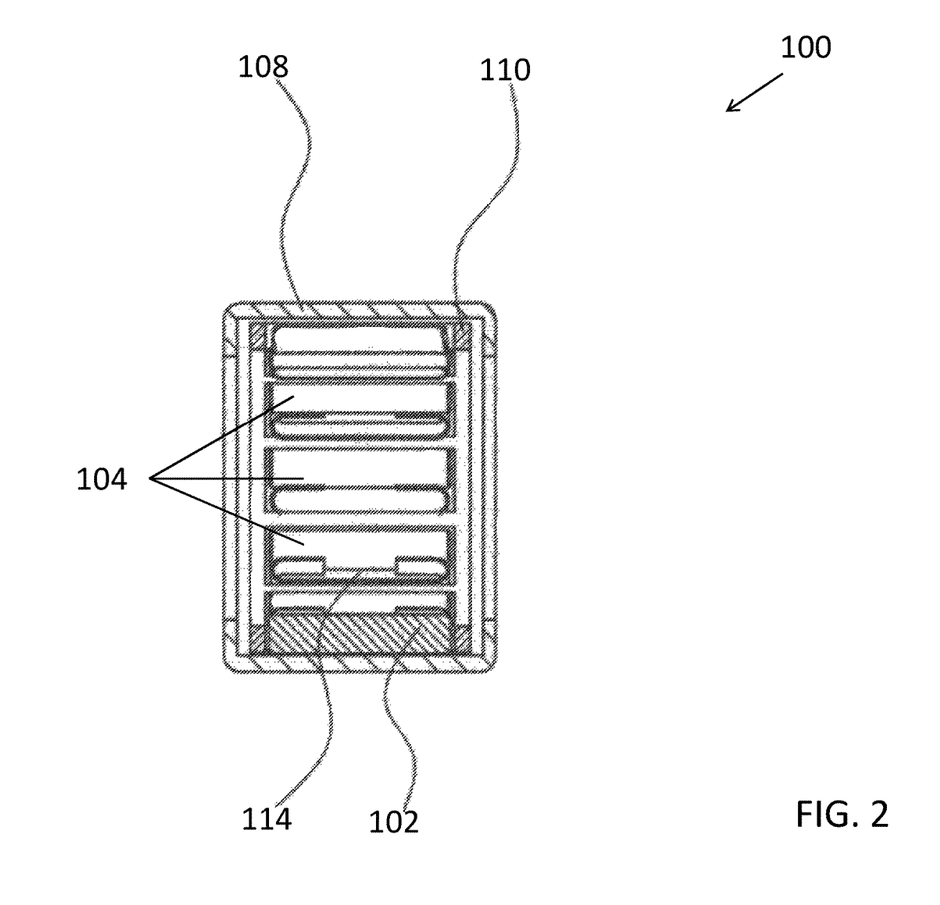
FIG. 2 is another cross-sectional view of the generic one-way bearing of FIG. 1.
Figure 3:
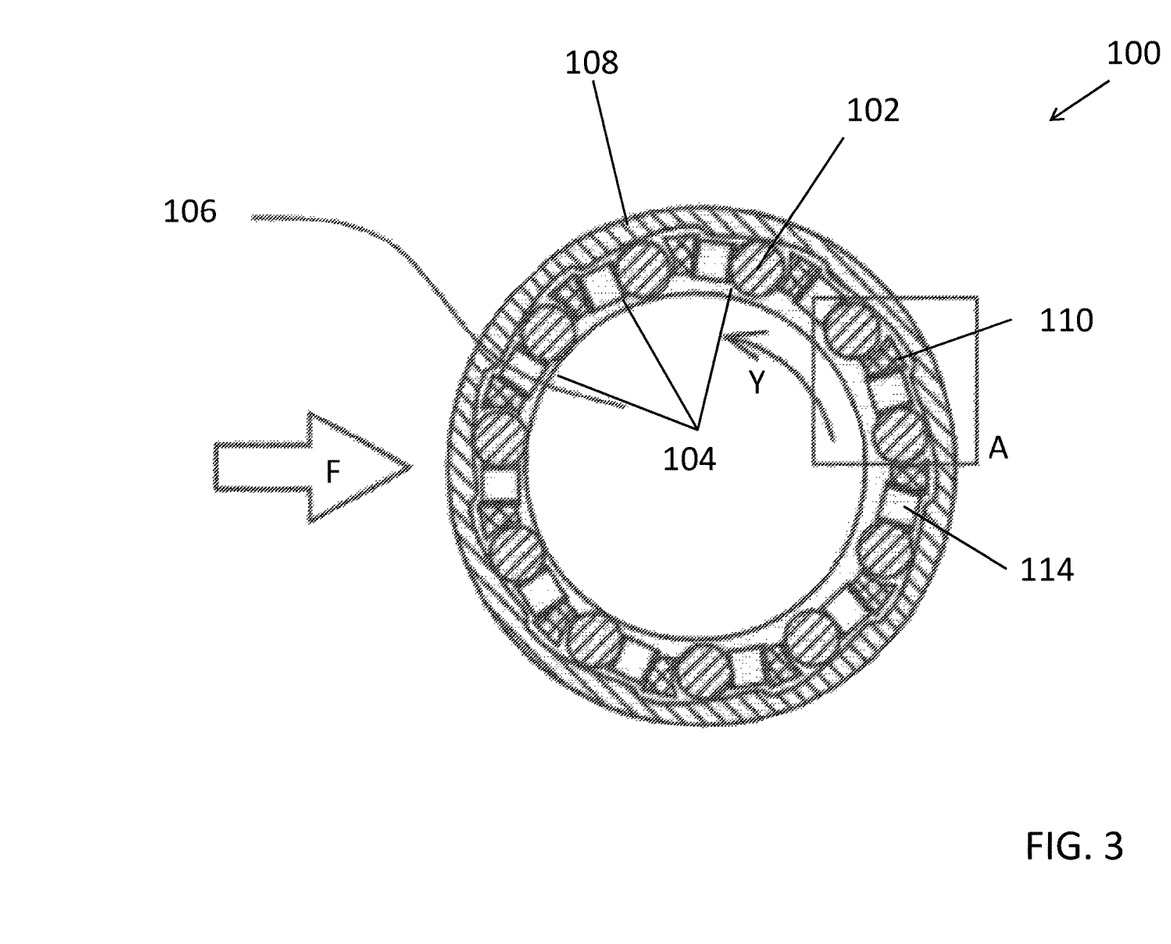
FIG. 3 is an illustration showing the cross-sectional view of the bearing of FIG. 1 when the rollers experience both a lateral force and a rotational force.

When a rotational shaft 106 is configured to rotate in the first direction X as shown in FIG. 1, the rollers 102 rotate at the wider side 104W within the cavities 104, such that the rotational shaft 106 may rotate smoothly with respect to the central axis of the bearing 100. However, when the rotational shaft 106 is forced to rotate in the second direction Y (opposite to the first direction X) as shown in FIG. 3, the rollers 102 rotate in opposite direction and moves to the narrower side 104N within the cavities 104. As a result, the rollers 102 are force to move towards the central axis of the bearing 100 by the wedge shaped protrusions 108P on the outer race 108 and thus restrict the rotational movement of the rotational shaft 106 due to the frictional force between the shaft 106 and the rollers 102 and the frictional force between the rollers 102 and the outer race 108. When the rotational shaft 106 is not forced to rotate in the second direction Y or is again configured to rotate in the first direction X, the roller 102 moves back to the wider side 104W within the wedge shape cavity 104 (with or without the help of the biasing force applied on the rollers 102 in the first direction X by the spring member 114 adjacent to each of the rollers 102), the restriction is released and thus the rotational shaft 106 may rotate in the first direction X again.

Figure 4:
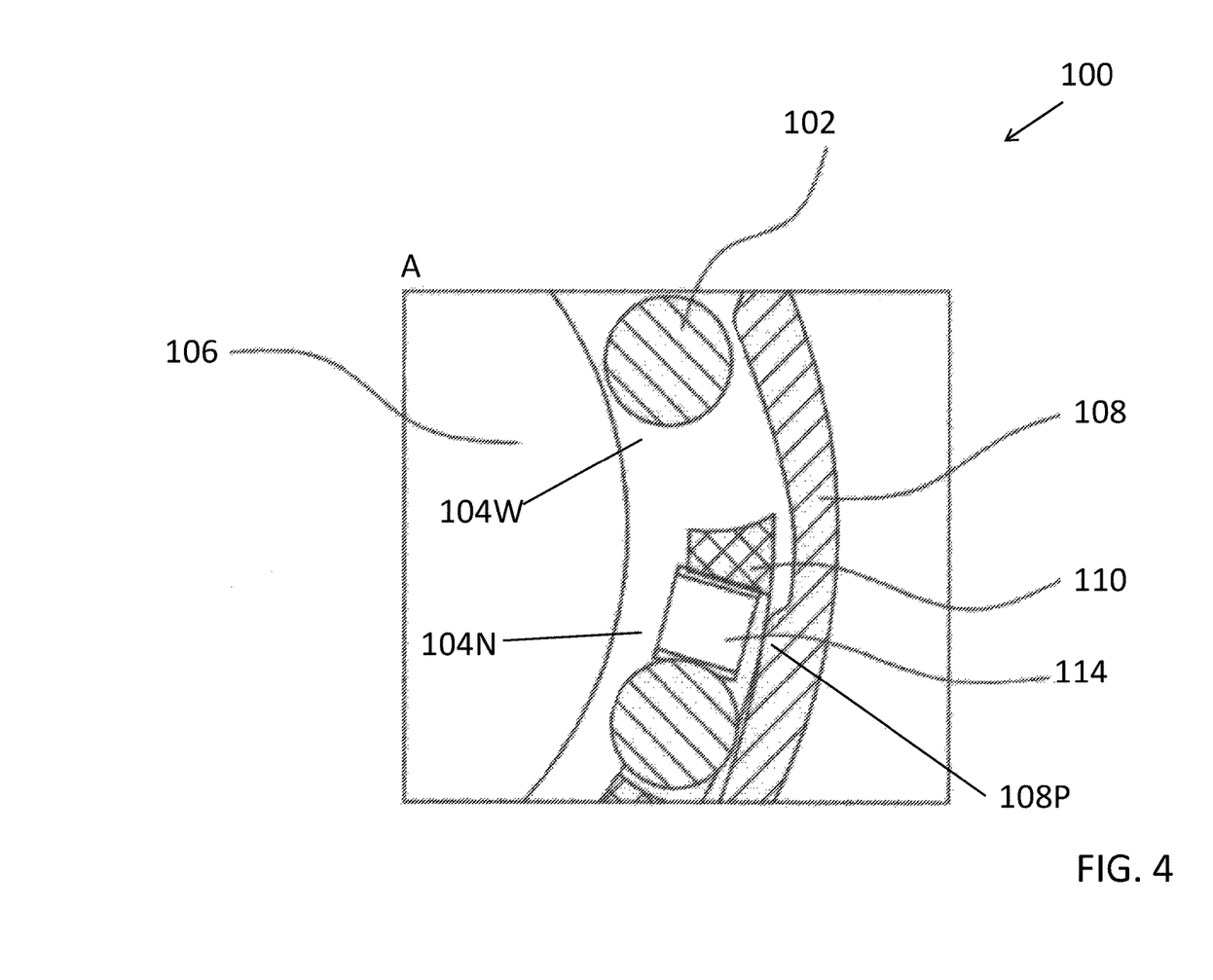
FIG. 4 is an illustration showing an enlarged area A of FIG. 3.

The rollers 102 are operated to both restricting the rotation movement of the rotational shaft 106 in a second direction Y and supporting the mechanical structure to oppose any lateral force along the radial direction with respect to the central axis of the bearing 100. With reference to FIGS. 3 to 4, when the one-way bearing 100 experience a lateral force F along a radial direction with respect to the central rotational axis of the bearing 100, the rotational shaft 106 may move laterally towards the outer race 108 opposite to the direction of the lateral force F. In this situation, the rotational shaft 106 is offset from the central rotational axis of the bearing 100, and hence enlarging the cavities 104 on one side (right side as shown in FIG. 3) of the bearing 100.

At the same time when the rotational shaft 106 is forced to rotate in the second direction Y, the rollers 102 in the enlarged cavities 104 (on the right side as shown in FIG. 3) may fail to apply sufficient frictional force to the rotational shaft 106, or the rollers 102 may even bypass the wedge shaped protrusion 108P and may enter the adjacent cavity 104. As a result, the bearing 100 and the associated mechanical structure may fail completely.

Figure 5:
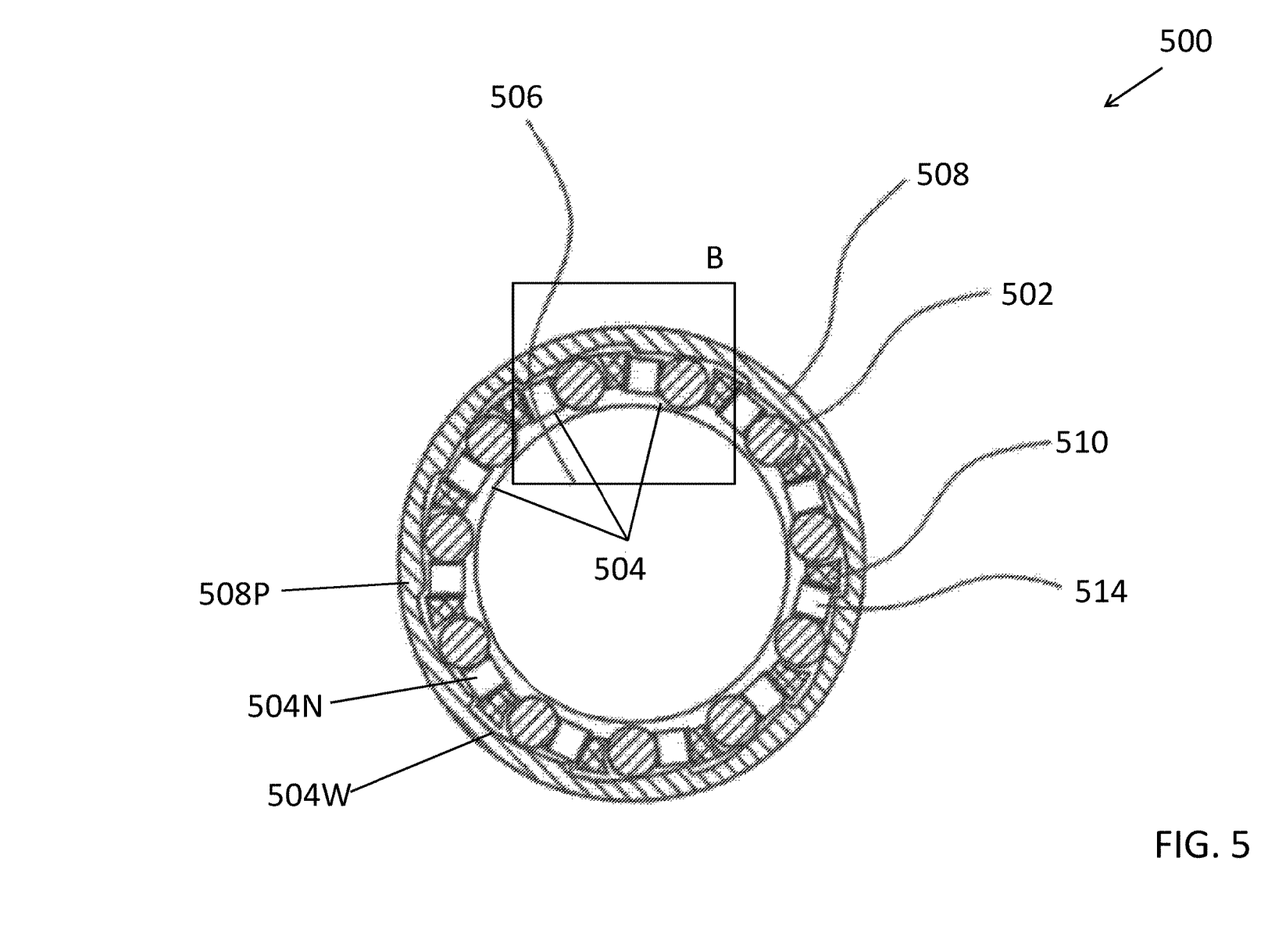
FIG. 5 is a cross-sectional view of a one-way bearing in accordance with one embodiment of the present invention.
Figure 6:
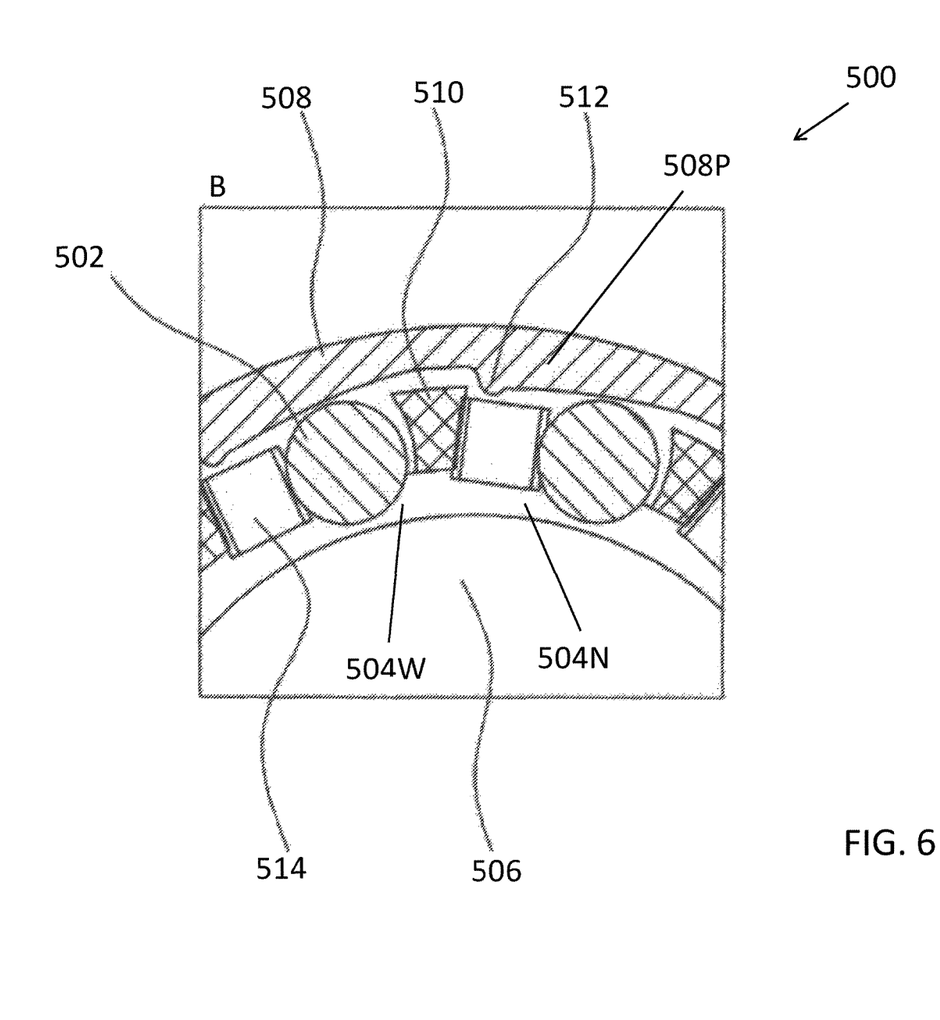
FIG. 6 is an illustration showing an enlarged area B of FIG. 5.
Figure 7:
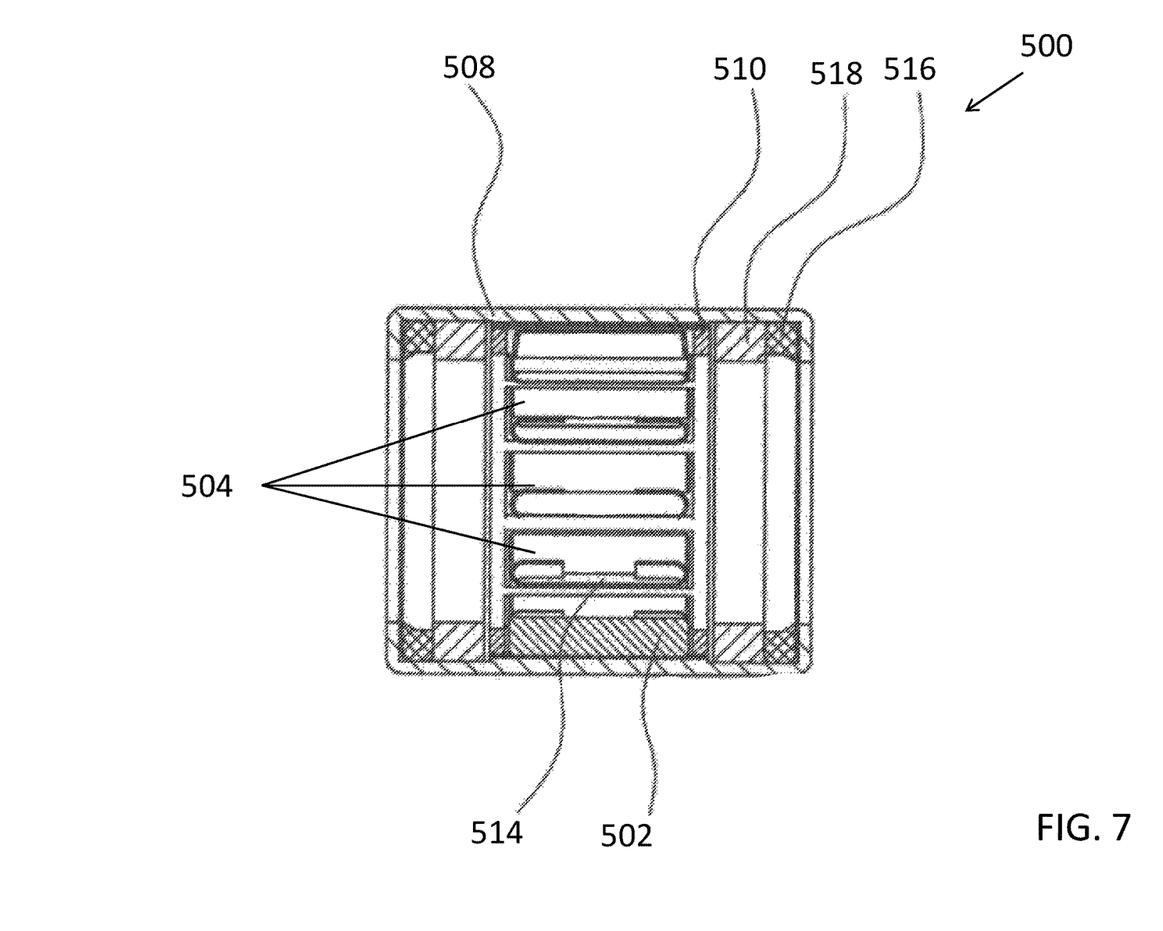
FIG. 7 is another cross-sectional view of the generic one-way bearing of FIG. 5.

With reference to FIGS. 5 to 7, there is provided a one-way bearing 500, comprising: an outer race 508 fixed around an inner supporting bracket 510, wherein the combination of the outer race 508 and the inner supporting bracket 510 defines a plurality of cavities 504 between the outer race 508 and the inner supporting bracket 510; and a rolling member 502 provided in each of the plurality of cavities 504, wherein the rolling member 502 is arrange to rotate and move within each of the plurality of cavities 504; wherein a blocking structure 512 is provided at each of the plurality of cavities 504 so as to block the rolling member 502 within each of the plurality of cavities 504 from entering an adjacent cavity 504.

In this embodiment, the outer race 508 is preferably a cylindrical frame arranged to at least partially encapsulate the components of the bearing 500, and is preferably made of hard and stiff material such as metal so as to provide sufficient mechanical supports to the components as well as the associated mechanical structures. When the inner supporting bracket 510 is combined with the outer race 508, the inner supporting bracket 510 is coaxially fixed to the outer race 508 such that a plurality of substantially identical cavities 504 is defined between the outer race 508 and the inner supporting bracket 510.

A rolling member 502 is deposited or mounted within each of the cavities 504. The rolling members 502 are arranged to slightly protruding out from the inner peripheral surface of the inner supporting bracket 510 such that when a rotational shaft 506 is placed along the central rotational axis of the bearing 500, the rotational shaft 506 is arranged to tangentially touching each of the rolling members 502 and may rotate with respect to the central rotational axis of the bearing 500, at the same time, each of the rolling members 502 are arranged to rotate in a direction opposite to the rotational direction of the rotational shaft 506 with respect to each individual rotational axis of the rolling members 502.

Preferably, each of the plurality of cavities 504 may be wedge shaped, such that each of the cavities 504 may include a narrower side 504N and a wider side 504W. In the example embodiment as shown in FIGS. 5 to 7, a plurality of wedge shaped protrusion 508P is provided at an inner peripheral surface of the outer race 508, such that each of the plurality of cavities 504 is defined by a wedge shaped protrusion 508P deposited at an inner peripheral surface of the outer race 508 and the inner supporting bracket 510.

Preferably, the one-way bearing 500 further comprises a biasing member 514 provided in each of the plurality of cavities 504. As shown in FIGS. 5 to 6, the biasing member 514 may be a spring plate, and the spring plate 514 is deposited adjacent to the rolling member 502, preferably at the same adjacent side of the rolling member 502 and/or the inner supporting bracket 510. Each biasing member or the spring plate 514 is arranged to bias the associated rolling member 502 towards the wider side 504W (or towards the first direction X as shown in FIG. 1) within each of the plurality of cavities 504.

As similarly illustrated in the examples in of FIGS. 1 to 4, each of the rolling members 502 in the embodiments as shown in FIGS. 5 to 7 may rotate and move preferably between the narrower side 504N and the wider side 504W within each of the respective cavity 504. When the rotational shaft 506 is configured to rotate in the first direction X as shown in FIG. 1, the rolling members 502 moves to the wider side 504W within the cavities 504, such that the rotational shaft 506 may rotate smoothly with respect to the central axis of the bearing 500. However, when the rotational shaft 506 is forced to rotate in the second direction Y (opposite to the first direction X) as shown in FIG. 3, the rolling members 502 moves to the narrower side 504N within the cavities 504 so as to restrict the rotational movement of the rotational shaft 506 with the fractional forces generated between the shaft 506, the rolling members 502 and the inner peripheral surface of the outer race 508.

Preferably, each of the rolling members 502 may be a roller or a needle roller as shown in FIG. 7. Alternatively, the rolling members 502 may be cylindrical rollers, tapered rollers, conical rollers, spherical rollers, ball rollers or any other rolling structures as appreciated by a person skilled in the art.

Referring to FIGS. 5 to 6, the one-way bearing 500 further comprises a blocking structure 512 provided at each of the plurality of cavities 504. For example, the blocking structure is a protrusion rib 512 positioned at the inner peripheral surface of the outer race 508, and preferably on the wedge shaped protrusion 508P at the narrower side 504N of the cavity 504, so as to block the rolling member 502 in each of the cavities 504 from bypassing the wedge shaped protrusion 508P thus entering an adjacent cavity 504. The protrusion rib 512 may be integrally formed on each of the wedge shaped protrusions 508P provided on the inner peripheral surface.

In an example operation, when the rotational shaft 506 is forced to rotate in the second direction Y as shown in FIG. 3, the rolling members 502 moves to the narrower side 504N within the cavities 504 so as to restrict the rotational movement of the rotational shaft 506 with the fractional forces generated between the shaft 506, the rolling members 502 and the inner peripheral surface of the outer race 508. In this situation, even if a larger rotational force is exerted on the rotational shaft 506 in the second direction Y, the blocking structure 512 is operable to block the rolling member 502 from bypassing the blocking structure 512 and the wedge shaped protrusion 508P so as to prevent the rolling member 502 from entering the adjacent cavity 504. Therefore the blocking structure 512 may prevent the bearing 500 from jamming with any one of the rolling member 502 entering an adjacent cavity 504.

In this embodiment, the bearing 500 further comprises a metal ring 518 at each side along the central rotational axis. Referring to FIG. 7, a metal ring 518 such as a copper ring is provided at both the left side and the right side of the inner supporting bracket 510. Preferably, each of the copper rings 518 includes an inner diameter matching or slightly larger than the rotational shaft 506, such that the metal ring 518 may provide supplementary support to the rotational shaft 506, especially when upon the rotational shaft 506 experiences a lateral force along a radial direction with respect to the central rotational axis.

Advantageously, the rolling members 502 may bear less lateral or radial forces, and the rotational shaft 506 may offset less due to a better matching between the inner diameter of the metal rings 518 and the outer diameter of the shaft 506, which further protect the bearing 500 from damaging due to external radial forces exerted thereon. In addition, by maintaining the rotational shaft 506 less offset from the central rotational axis, the rotation of each of the rolling elements 502 is less affected by the unbalanced force exerted to each of the rolling elements 502, thus the rotation of each of the rolling members 502 is kept smooth hence improving the rotational movement of the rotational shaft 506.

Optionally, as shown in FIG. 7, a seal ring 516 is provided adjacent to each of the copper rings 518 at both sides of the bearing 500, preferably the between each of the copper rings 518 and the rim defined by the outer race 508. The seal rings 516 may include an inner diameter smaller than the inner diameter of the metal ring 518 such that the seal rings 516 may not affect the rotational movement of the rotational shaft 506. Preferably, the seal rings 516 may be manufactured with an elastic material so as to tightly fill the gap between the outer race 508 and the copper rings 518. The seal rings 516 are arranged to prevent debris, dust and/or water from entering the plurality of cavities 504 which may block or affect the rotation or movement of the rolling members 502. Additionally, the seal rings 516 may also prevent a leakage of lubricant (such as grease or oil) applied to the cavities 504 and/or the rolling members 502.

These embodiments are advantageous in that the one-way bearing may be implemented in mechanical structures or apparatus for used in a harsh condition, such as in an outdoor product with occasional excessive lateral or radial forces exerted to the bearing. The improved structure may provide additional supportive forces to the rotational shaft such that the associated mechanical structures are more robust and resistance to damages or failures. For example, the one-way bearing may be implemented to outdoor transportation apparatus such as scooters, cycle or motor vehicles. In addition, the sealed structures benefited by the seal rings provided are more favourable for outdoor operation than generic structures.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A one-way bearing, comprising:
   an outer race fixed around an inner supporting bracket, wherein the combination of the outer race and the inner supporting bracket defines a plurality of cavities between the outer race and the inner supporting bracket; and
   a rolling member provided in each of the plurality of cavities, wherein the rolling member is arrange to rotate and move within each of the plurality of cavities;
   wherein a blocking structure is provided at each of the plurality of cavities so as to block the rolling member within each of the plurality of cavities from entering an adjacent cavity; and wherein the blocking structure is positioned at a narrower side of each of the plurality of cavities.

2. A one-way bearing in accordance with claim 1, wherein the blocking structure is arranged to block the rolling member from entering the adjacent cavity when upon the rolling members experiences a lateral force along a radial direction with respect to a central rotational axis of the one-way bearing and a rotational force with respect to the central rotational axis.

3. A one-way bearing in accordance with claim 2, wherein the rolling members are arranged to permit a rotational shaft placed along the central rotational axis to rotate in a first direction with respect to the outer race and to prevent the rotational shaft to rotate in a second direction opposite to the first direction with respect to the outer race.

4. A one-way bearing in accordance with claim 3, wherein the rolling member is configured to move to a narrower side of each of the plurality of cavities when the rotational shaft is forced to rotate in the second direction with respect to the outer race.

5. A one-way bearing in accordance with claim 2, further comprising a metal ring at each side along the central rotational axis.

6. A one-way bearing in accordance with claim 5, wherein the metal ring is arranged to provide supplementary support to the rotational shaft when upon the rotational shaft experiences a lateral force along a radial direction with respect to the central rotational axis.

7. A one-way bearing in accordance with claim 5, wherein the metal ring is a copper ring.

8. A one-way bearing in accordance with claim 5, further comprising a seal ring adjacent to each metal ring.

9. A one-way bearing in accordance with claim 8, wherein the seal ring is arranged to prevent debris, dust and/or water from entering the plurality of cavities.

10. A one-way bearing in accordance with claim 8, wherein the seal ring is arranged to prevent a leakage of lubricant applied to the plurality of cavities and/or the rolling members.

11. A one-way bearing in accordance with claim 8, wherein the seal ring includes an inner diameter smaller than an inner diameter of the metal ring.

12. A one-way bearing in accordance with claim 1, wherein each of the plurality of cavities is defined by a wedge shaped protrusion deposited at an inner peripheral surface of the outer race and the inner supporting bracket.

13. A one-way bearing in accordance with claim 12, wherein each of the plurality of cavities is wedge shaped.

14. A one-way bearing in accordance with claim 1, wherein the blocking structure is a protrusion rib positioned at an inner peripheral surface of the outer race.

15. A one-way bearing in accordance with claim 1, further comprising a biasing member provided in each of the plurality of cavities, wherein each of the biasing member is arranged to bias the rolling member within the respective cavity of the plurality of cavities.

16. A one-way bearing in accordance with claim 15, wherein the biasing member is arranged to bias the rolling member towards a wider side within each of the plurality of cavities.

17. A one-way bearing in accordance with claim 15, wherein the biasing member is a spring plate.

18. A one-way bearing in accordance with claim 1, wherein the rolling member is a roller.

19. A one-way bearing in accordance with claim 1, wherein the rolling member is a needle roller.

\* \* \* \* \*